2 Sheets—Sheet 1.

W. DAVIS.

Refrigerating Car.

No. 3,119. Reissued Sept. 15, 1868.

Witnesses

Henry C. Myers
Fredl. Andre

Inventor,

W. Davis
per N. Crawford atty

2 Sheets—Sheet 2.

W. DAVIS.

Refrigerating Car.

Reissued Sept. 15, 1868.

No. 3,119.

Witnesses

J. Lundin Bell

Henry E. Wyatt

Inventor

Wm Davis per N. Crawford atty

UNITED STATES PATENT OFFICE.

WILLIAM, SAMUEL H., AND DAVID W. DAVIS, OF DETROIT, MICHIGAN, ASSIGNEES OF WILLIAM DAVIS.

IMPROVEMENT IN PRESERVING MEATS, FRUIT, &c.

Specification forming part of Letters Patent No. 78,932, dated June 16, 1868; reissue No. 3,119, dated September 15, 1868.

*To all whom it may concern:*

Be it known that WM. DAVIS, of Detroit, in the county of Wayne and State of Michigan, did invent certain new and useful Improvements in Apparatus for Preserving Meats, Fruits, &c., and obtained Letters Patent therefor, which patent was dated June 16, 1868, and we, WILLIAM DAVIS, SAMUEL H. DAVIS, and DAVID W. DAVIS, of Detroit aforesaid, are the sole owners by assignment of the entire interest and property in said patent; and we do hereby declare that the following is a full and exact description thereof, reference being had to the accompanying drawings, making part of this specification, and the letters of reference marked thereon.

Figure 1:
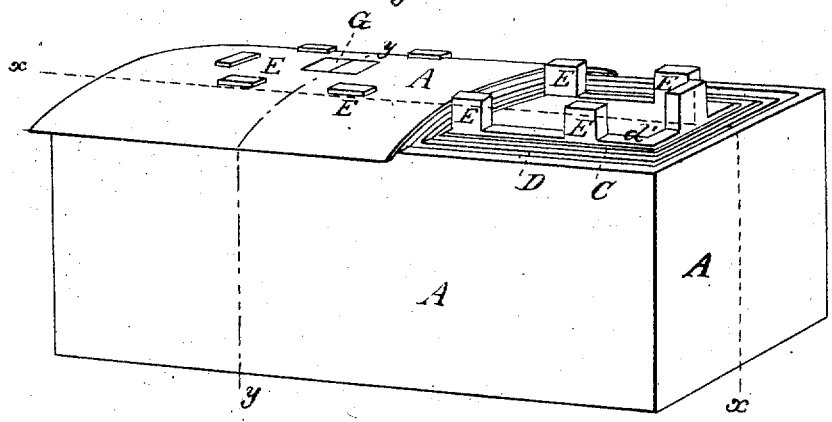
Figure 2:
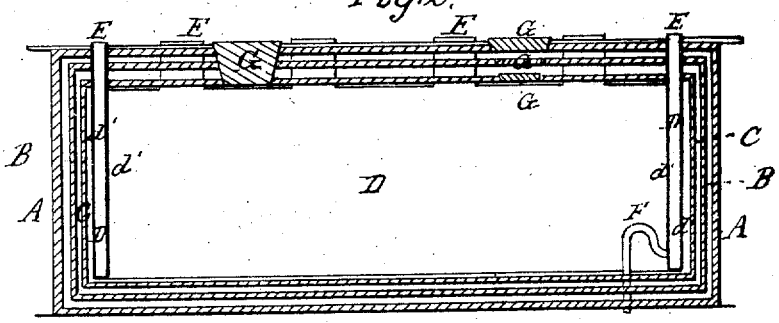
Figure 3:
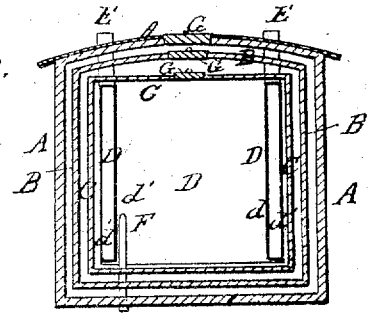
Figure 4:
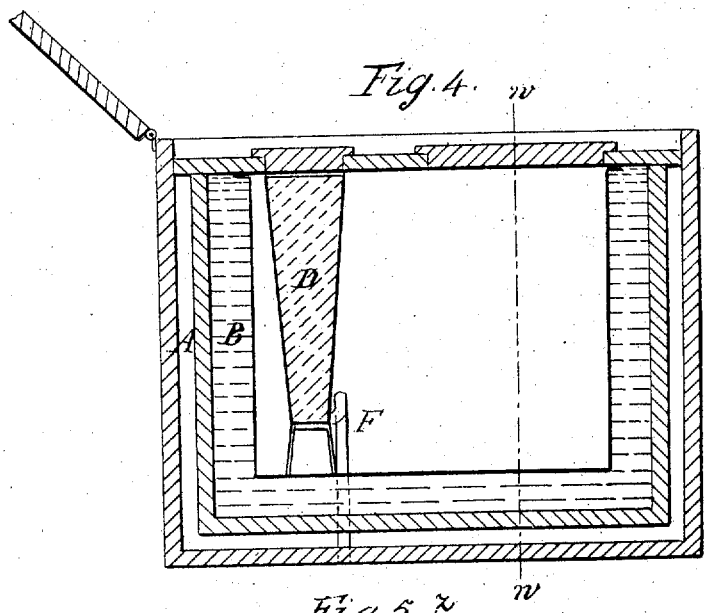
Figure 5:
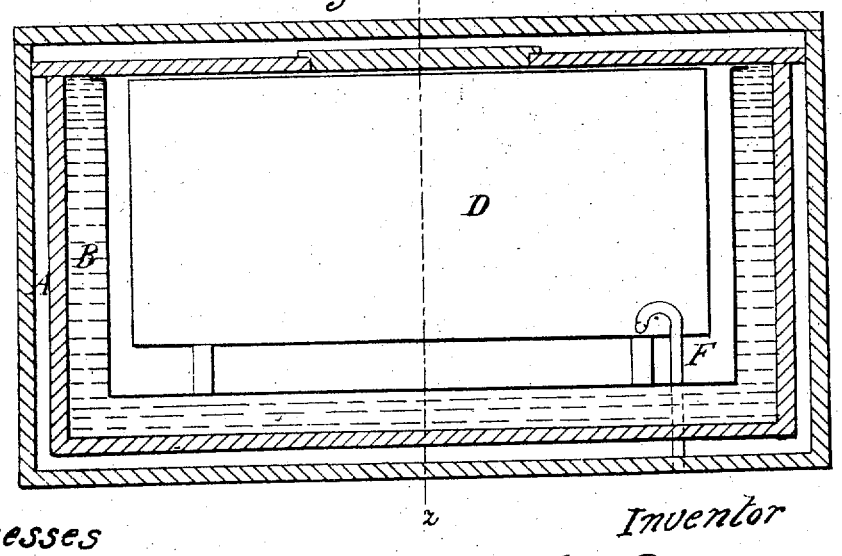

Figure 1 is a perspective view of a railroad-car containing our invention. Fig. 2 is a longitudinal section of same. Fig. 3 is a cross-section of same. Fig. 4 is a cross-section of the invention applied to a box. Fig. 5 is a longitudinal section of same.

The object of this invention is to preserve fresh meats, fruits, fish, or other animal or vegetable substance for a much greater length of time than has heretofore been done, and prevent for a longer time decomposition or fermentation; and it consists in a peculiar construction of the receiving-chamber, which may be a railroad-car, the hold of a vessel, a box, chest, or room in a building, and having suspended within such chamber an ice-receptacle for holding a freezing-mixture, and the necessary funnels, hatches, and drain-trap.

In the drawings we have represented the body of a railroad-car and a box constructed according to our invention; but it can be applied to ships' holds, chests, and rooms in buildings as well. The car or box is constructed of three separate compartments, A B C, one within the other, and arranged in such manner that there is an open space all around the innermost compartment C, which contains the articles or substance to be preserved as well as the compartment B. One or more of the spaces between the compartments I fill with poor conductors of heat, such as animal hair, dry shavings, or any non-conducting substance. Inside of the compartment C is the ice-receptacle D, which consists of a double metallic wall, *d d'*, extending from near the bottom of chamber C, but leaving a space between it and the bottom of chamber C to the top of said chamber C, and closed air-tight, except where chimneys or funnels E extend upward from the ice-receptacle D through the roofs or lids of the compartments A B C, and which serves to contain the freezing-mixture, which is filled in through the chimneys or funnels E. The ice-receptacle D is constructed with its sides slightly inclined or tapering from the top to the bottom, so that the bottom is less in area than the top.

This construction is an essential feature to the complete and successful operation of the invention, for, as the ice contained in the receptacle is continually melting, these inclined sides or walls afford the means of keeping the ice in close contact with all parts of the sides or walls, thus keeping a continuous and perfect contact as long as the supply of ice in the receptacle remains, which causes the moisture in chamber C to be frozen upon the outer sides of the walls of receptacle D, and by this construction and adaptation accomplishing a result never before obtained by other arrangements or constructions. The walls of said ice-receptacle may be perpendicular or equilateral, but we prefer the inclined sides as the best in effect.

By the arrangement of the ice-receptacle in and with relation to chamber C, as shown, only a thin film of air lies between the top of the receptacle and the wall of chamber C. The air in this thin space is colder or at a lower temperature than in any other portion of chamber C; hence there is a current or circulation of the air from the thin space between the top of the receptacle and the wall of chamber C downward and under the receptacle into the space in chamber C between the ice-receptacle and the opposite wall, until the whole air in the chamber is at the same temperature.

We do not confine ourselves to any particular freezing-mixture, as any known mixture in any known proportions will answer, and may be used according to varying circumstances.

The chimneys or funnels E are provided with covers or caps which close the receptacle D as nearly air-tight as practicable, and in cars we have a part extending down through chimneys E just below the roof of compartment C, so that any heat passing through the spaces between the compartments through which the chimneys pass cannot be communicated through the latter to the ice-receptacle D. In boxes these openings for the admission of ice are closed by lids and hinged for convenience. The water or fluid which melts from the freezing-mixture is collected at the lower part of the receptacle D, which is provided with a goose-neck trap, F, or other equivalent device, through which the water can escape without any air being admitted into the ice-receptacle, sufficient air always being contained in the same to allow the water to flow from the receptacle. Access to the inside of the car or box is had through hatchways or doors in the roofs of the compartments A B C, which are closed practically air-tight by hatches G, each separate compartment being provided with one; or one door serving to close all three hatchways, can be used, as seen in Fig. 2.

In smaller structures single covers may be used, as shown on Sheet 2, Figs. 4 and 5.

These hatches G we prefer to construct with beveled edges to fit the beveled openings of the hatchways, as the openings can be closed more effectually by this than by other constructions.

Doors may be placed in the sides of the car, and closed in the same manner as the hatchways in the roof. Thus a car may be loaded at the starting-point with meats and fruits or other decomposable substance, and placed in chamber C surrounding the ice receptacle D through the side doors, which can be closed, as above described, but should not be opened during transit; and to discharge freight from chamber C at way-stations the hatchway must be used, for if the side doors were opened the cold air, which is heavier, would pass out, while the warm air from the outside would at once fill the car or box and affect its contents; but when the hatchways in the roof are opened the cold and heavy air cannot rise out of the car or box, nor can the outer warmer air descend into the car to displace the cold or heavier air, and thus part of the freight may be discharged from the car through the roof-doors as often as may be necessary without danger of admitting outside air, thus effectually confining the cold air in chamber C.

This construction is especially adapted to the holds of vessels, and by which means meats may for a long time be preserved in good condition for healthy food, or tropical fruits may be perfectly preserved from the usual decay consequent from a long sea voyage, thereby making a great saving in the amount of sound fruit discharged at the end of the voyage, as well as preserving the whole fruit in a more healthy condition, and consequently rendering it more valuable.

Another advantage this method of preserving has over all others is, after meats, fruits, or other things have for a sufficient length of time been in the receiving-chamber, and much of the moisture contained therein expelled and frozen upon the outside of the walls of the ice-receptacle, such meats and fruits or other things can be taken out, and the exposure to the common atmosphere will not at once effect such things as is ordinarily the case with such articles when taken from a cold chamber, for the reason that much of the moisture in such articles has been expelled, and decomposition will not take place without a sufficient amount of moisture present in such articles; hence the meat or fruit must absorb moisture from the air before decomposition takes place.

In case the temperature in the preserving-chamber C is raised by any means a vessel may be placed under the ice-receptacle to catch the water that is made by the thawing of the ice upon the outside of the receptacle.

We do not confine ourselves to the exact construction of the car or box or other thing employed, as described, for other constructions would answer the purpose and produce the same results; as, for instance, the outer walls may be made of solid wood, and thicker than has been shown; and other kinds of packing—such as wool or felt—may be used, as such changes may be made without changing in any way the principle of our invention and its application to the uses and purposes intended.

Having thus described our invention, what we claim as new therein, and desire to secure by Letters Patent, is—

1. The construction of a car-body, ship's hold, room, box, or chest, provided with compartments A B C, ice-receptacle D, chimney E, and hatches G, when arranged and operating substantially as described, for the purposes set forth.

2. The goose-neck trap F or equivalent, in combination with receptacle D and compartments A B C, when arranged substantially as and for the purposes set forth.

3. The receptacle D for the freezing-mixture, so constructed and arranged as to be pendent from the inner upper wall of chamber C, and allowing a free circulation underneath the receptacle and on all sides, substantially as described.

4. The construction and relative arrangement of the ice-receptacle D with the chamber C, whereby the moisture in said chamber C is frozen to the walls of receptacle D, substantially in the manner and by the means described.

WILLIAM DAVIS.
SAMUEL H. DAVIS.
DAVID W. DAVIS.

Witnesses:
C. T. ALLEN,
JAMES CRABB.